US011526296B2

(12) United States Patent
You et al.

(10) Patent No.: US 11,526,296 B2
(45) Date of Patent: Dec. 13, 2022

(54) CONTROLLER PROVIDING HOST WITH MAP INFORMATION OF PHYSICAL ADDRESS FOR MEMORY REGION, AND OPERATION METHOD THEREOF

(71) Applicant: SK hynix Inc., Gyeonggi-do (KR)

(72) Inventors: Ho Ryong You, Gyeonggi-do (KR); Su Hwan Kim, Gyeonggi-do (KR); Seung Hun Kim, Gyeonggi-do (KR); Ji Hoon Seok, Gyeonggi-do (KR); Young Bin Song, Gyeonggi-do (KR); Dong Sun Shin, Gyeonggi-do (KR); Jae Yeon Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/073,985

(22) Filed: Oct. 19, 2020

(65) Prior Publication Data

US 2021/0278993 A1 Sep. 9, 2021

(30) Foreign Application Priority Data

Mar. 4, 2020 (KR) .................. 10-2020-0026971

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC .... G06F 3/0604; G06F 3/0655; G06F 3/0679; G06F 3/0659; G06F 3/0656; G06F 12/0246; G06F 12/1009; G06F 12/0862; G06F 12/0292; G06F 12/0802; G06F 12/10; G06F 2212/657; G06F 2212/7201; G06F 2212/68

See application file for complete search history.

(56) References Cited

U.S. PATENT DOCUMENTS

| 9,378,135 | B2 | 6/2016 | Bennett | |
| 2014/0281171 | A1* | 9/2014 | Canepa | G06F 3/0619 711/147 |
| 2016/0124649 | A1* | 5/2016 | Liu | G06F 3/061 711/103 |

(Continued)

FOREIGN PATENT DOCUMENTS

| KR | 10-2018-0003713 | 1/2018 |
| KR | 10-2018-0059208 | 6/2018 |

*Primary Examiner* — Jane W Benner
(74) *Attorney, Agent, or Firm* — IP & T Group LLP

(57) ABSTRACT

An operation method of a controller for controlling a memory device includes: queuing an identifier of a logical address region associated with a read request from a host in a most recently used (MRU) entry of an internal logical address region queue; increasing a weighted value for a read count of the logical address region by a first value according to whether the identifier of the logical address region has been queued in the logical address region queue before being queued in the MRU entry; adding the weighted value to the read count of the logical address region; providing the host with a map segment corresponding to the logical address region according to a threshold of the read count; and controlling a read operation of the memory device based on a physical address according to whether the read request includes the physical address.

15 Claims, 11 Drawing Sheets

(56) References Cited

U.S. PATENT DOCUMENTS

2016/0179685 A1\* 6/2016 Byun ................. G06F 12/0802
  711/118
2019/0138437 A1\* 5/2019 Bennett ................ G06F 3/0647

\* cited by examiner

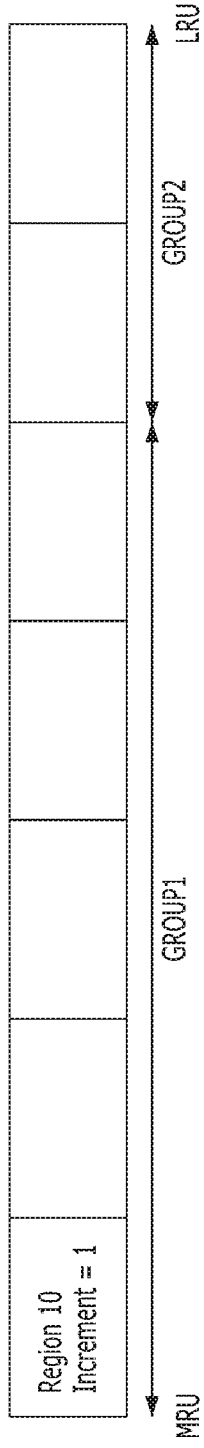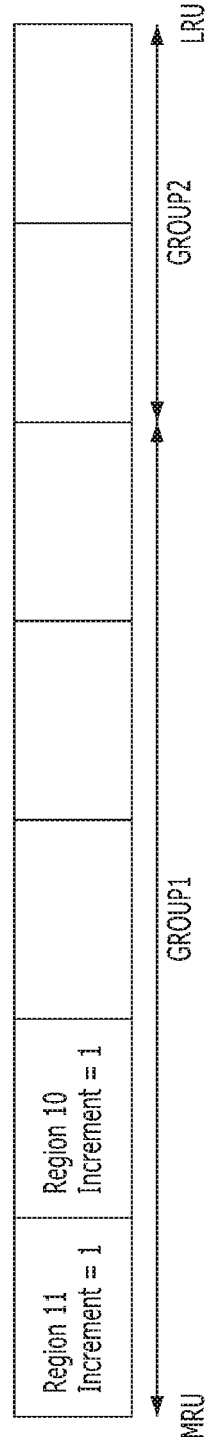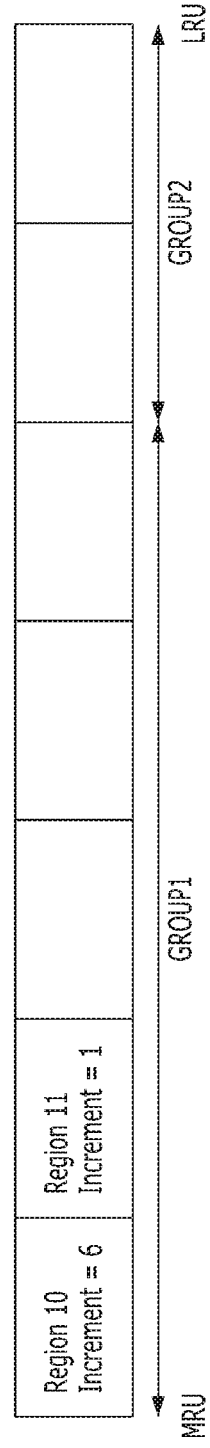

CONTROLLER PROVIDING HOST WITH MAP INFORMATION OF PHYSICAL ADDRESS FOR MEMORY REGION, AND OPERATION METHOD THEREOF

CROSS-REFERENCE TO RELATED APPLICATION

This application claims priority under 35 U.S.C. § 119 to Korean Patent Application No. 10-2020-0026971, filed on Mar. 4, 2020, which is incorporated herein by reference in its entirety.

BACKGROUND

1. Field

Various embodiments relate to a memory system including a memory device, an operation method of a controller, and a data processing system including the controller.

2. Discussion of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSDs).

SUMMARY

Various embodiments are directed to a method and a device, which enable a request with a physical address of data to be read by a host to be provided to a memory system by providing, at the right time, the host with map data expected to be frequently referenced by the memory system.

Technical problems to be solved or overcome in the present disclosure are not limited to those mentioned above; other technical problems will be clearly understood by those skilled in the art from the following description.

In an embodiment of the present disclosure, an operation method of a controller for controlling a memory device may include: queuing an identifier of a logical address region associated with a read request from a host in a most recently used (MRU) entry of an internal logical address region queue; increasing a weighted value for a read count of the logical address region by a first value according to whether the identifier of the logical address region has been queued in the logical address region queue before being queued in the MRU entry; adding the weighted value to the read count of the logical address region; providing the host with a map segment corresponding to the logical address region according to a threshold of the read count; and controlling a read operation of the memory device based on a physical address according to whether the read request includes the physical address.

In an embodiment of the present disclosure, a controller for controlling a memory device may include: a memory configured to store a read count for each logical address region and a logical address region queue for queuing recently accessed logical address regions; and a processor configured to queue an identifier of a logical address region associated with a read request from a host in a most recently used (MRU) entry of an internal logical address region queue, increase a weighted value for a read count of the logical address region by a first value according to whether the identifier of the logical address region has been queued in the logical address region queue before being queued in the MRU entry, add the weighted value to the read count of the logical address region, provide the host with a map segment corresponding to the logical address region according to a threshold of the read count, and control a read operation of the memory device based on a physical address according to whether the read request includes the physical address.

In an embodiment of the present disclosure, a system comprising: a host; a memory device including a plurality of memory regions; and a memory controller configured to: receive, from the host, read requests associated with the plurality of memory regions; determine a weight value for each memory region proportional to the number of read requests on that memory region, such that a memory region with relatively high number of read requests has a relatively high weight value and a memory region with relatively low number of read requests has a relatively low weight value; determine a read count for each memory region based on the number of read requests corresponding to that memory region and a corresponding weight value; and provide, to the host, map information of a physical address for a select memory region among the plurality of memory regions, the select memory region having a read count greater than a threshold, wherein the host is configured to: translate a logical address associated with a read operation on the select memory region to the physical address based on the map information; and transmit, to the controller, a read command and the physical address for the read operation on the select memory region.

Embodiments of the present disclosure provide a method and a device, which enable a request with a physical address of data, to be read by a host, to be provided to a memory system by providing, at the appropriate time, the host with map data expected to be frequently referenced by the memory system.

According to embodiments of the present disclosure, the probability of cache hit of a host cache is increased, so that the performance of the memory system can be improved.

Effects achievable in the disclosure are not limited to those identified above; other effects will be dearly understood by those skilled in the art from the following description.

BRIEF DESCRIPTION OF THE DRAWINGS

FIGS. 9A, 9B, 9C, 10A and 10B are diagrams illustrating a logical address region queue in accordance with an embodiment of the present disclosure.

DETAILED DESCRIPTION

Figure 1:
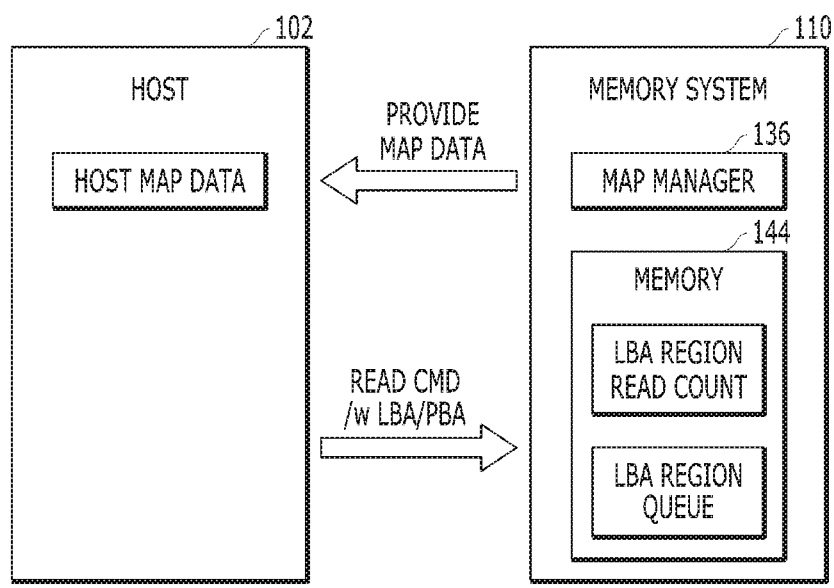
FIG. 1 is a diagram illustrating a sharing method of map data in accordance with an embodiment of the present disclosure.

Various embodiments are described below in more detail with reference to the accompanying drawings. The present disclosure may, however, be configured or arranged in different forms and ways; thus, the present invention is not limited to the embodiments set forth herein. Rather, these embodiments are provided so that this disclosure is thorough and complete, and fully conveys the scope of the present disclosure to those skilled in the art. Throughout the disclosure, like reference numerals refer to like parts throughout the various figures and embodiments of the present disclosure. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

FIG. 1 is a diagram illustrating a map data sharing method in accordance with an embodiment.

Referring to FIG. 1, a host 102 and a memory system 110 may cooperate with each other. The host 102 may be a computing device and implemented in the form of a mobile device, a computer and/or a server. The memory system 110 may receive a command from the host 102 and store or output data in response to the received command.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall function and operation of the host 102, and provide operation between the host 102 and a user using the data processing system 100 or the memory system 110. The OS may support functions and operations corresponding to the use purpose and usage of a user. The OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and/or micro-MMC. The SD card may include a mini-SD card and micro-SD card.

The memory system 110 may be embodied by any of various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may have a storage space including nonvolatile memory cells.

In order to store data requested by the host 102 in the storage space, the memory system 110 may perform mapping of a file system used by the host 102 to the storage space. For example, an address associated with data according to the file system may be referred to as a logical address and an address associated with data in the storage space may be referred to as a physical address.

The memory system 110 may store map data in an internal storage space. Furthermore, the memory system 110 may include a map manager 136 for managing the map data.

When the host 102 provides a logical address (i.e., LBA) to the memory system 110 together with a read request (or a read command (CMD)), the memory system 110 may search for a physical address (i.e., PBA) corresponding to the logical address, based on the mapping in map data stored therein and then output to the host 102 data stored at the physical address found in the search.

If the host 102 performs the physical address search instead of the memory system 110, time required for the memory system 110 to output data corresponding to the read request provided by the host 102 may be reduced. In this situation, the host 102 may store map data that the host 102 may directly access to search for a physical address and provide the physical address found in the search to the memory system 110.

In some embodiments, the memory system 110 may provide the map data to the host 102.

When the memory system 110 provides the host 102 with all the map data stored therein, the host 102 may have difficulty in assigning a storage space in a memory within the host 102 to store all the map data received from the memory system 110. Accordingly, instead of providing the host 102 with all map data, the memory system 110 may selectively provide the host 102 with some map data.

Hereinafter, map data selectively provided from the memory system 110 and stored in the host 102 is referred to as host map data. Furthermore, map data stored in the memory system 110 is referred to as memory map data.

When a logical address to be read is included in the host map data, the host 102 may provide the memory system 110 with a physical address acquired with reference to the logical address. On the other hand, when the logical address to be read is not included in the host map data, the host 102 may provide the memory system 110 with the logical address, and the memory system 110 may access the internal storage space with reference to the memory map data.

Since the host 102 may directly perform a physical address search for the logical address in the host map data, the higher the probability that a logical address to be read by the host 102 is included in the host map data, the better the access performance of the memory system 110. Accordingly, in order to improve read operation performance, the map manager 136 may recommend map data, which includes a logical address expected to be frequently read by the host 102 among the memory map data, to the host 102. The memory system 110 may provide the host 102 with the map data in response to a request of the host 102.

Depending on the spatial locality and temporal locality of a memory, a recently and frequently accessed logical address and logical addresses adjacent to the logical address may be frequently accessed in the future. Accordingly, based on the read tendency of the host 102 for each logical address region, the map manager 136 may expect one or more logical addresses to be frequently read. For example, the expectation that a particular logical address may be frequently read may be based on a read count for each logical address region. The map manager 136 may provide the host 102 with map data corresponding to a logical address region whose read count exceeds a threshold.

When the map manager 136 increases a read count of a corresponding logical address region by a fixed increment, for example, '1', each time the host 102 performs a read operation, read operation performance may not be sufficiently improved as a result of such incrementing because frequency is not considered. Thus, simply using by a method of increasing a read count of a logical address region by 1 by itself, it is difficult to determine whether the host 102 has frequently and recently performed a read operation of each logical address region or has intermittently performed the read operation of each logical address region over a long period of time. When the map manager 136 provides the host 102 with map data that is not frequently read, read operation performance may not be sufficiently improved.

In accordance with an embodiment of the present disclosure, the memory system 110 may include the map manager 136 that may determine a logical address region that is frequently and recently read and provide the host 102 with map data associated with the logical address region. As a logical address region corresponding to a read request from the host 102 is a logical address region frequently and recently accessed, the map manager 136 may add a weighted value to a read count of the logical address region.

For example, the map manager 136 may queue identifiers of recently accessed logical address regions in a logical address region queue of the memory 144, and store an increment in a read count each corresponding to queued logical address region identifier of the memory 144. When a logical address region identifier corresponding to a read request from the host 102 has already been queued in the logical address region queue, the map manager 136 may increase an increment (i.e., a weighted value) corresponding to the logical address region identifier and add the increased weighted value to a read count. When the logical address region identifier queued in the logical address region queue is not accessed for a long period of time, the map manager 136 may decrease the increment. The map manager 136 may provide the host 102 with map data corresponding to a logical address region whose read count exceeds a threshold.

In accordance with an embodiment of the present disclosure, each time a logical address region recently read frequently by the host 102 is accessed, a read count may significantly increase gradually. Accordingly, when a logical address region is read the same number of times, the read count of the logical address region that has been frequently and recently read may be greater than the read count of the logical address region that has been read intermittently over a long period of time. The map manager 136 may preferentially provide the host 102 with map data of the logical address region that is recently and frequently read. Since a logical address region that has been recently and frequently read is highly likely to be more frequently read in the future than a logical address region that has been read intermittently over a long period of time, the read operation performance of the memory system 110 may be improved.

In some implementations, when an operation, in which the map manager 136 provides the host 102 with map data, is performed too frequently, since the operation may impose a burden on the performance of the memory system 110, the map manager 136 may limit the number of items of map data recommended to be sent to the host 102 to a set maximum number of recommendations. In an embodiment, when providing the host 102 with some map data, the map manager 136 preferentially provides map data of a logical address region that is recently and frequently read. Thus, the read operation performance of the memory system 110 may be improved.

Figure 2:
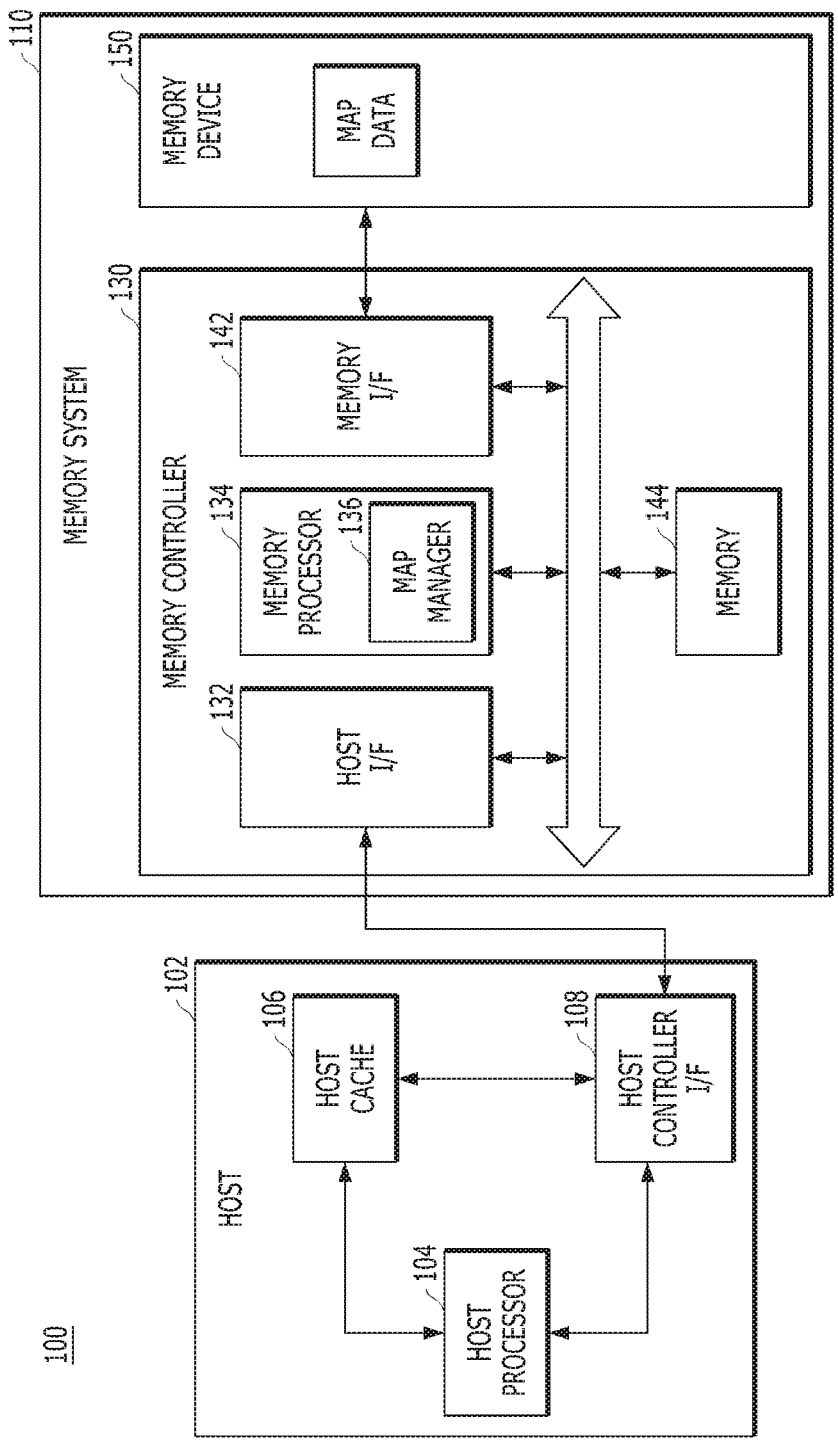
FIG. 2 is a diagram schematically illustrating an example of a data processing system including a memory system in accordance with an embodiment of the present disclosure.

FIG. 2 is a block diagram illustrating a data processing system 100 in accordance with an embodiment of the present invention.

Referring to FIG. 2, the data processing system 100 may include a host 102 and a memory system 110, which are described with reference to FIG. 1.

The memory system 110 may include a memory controller 130 and a memory device 150. The memory device 150 may store data for the host 102, and the memory controller 130 may control data storage into the memory device 150.

The memory controller 130 and the memory device 150 may be integrated into a single semiconductor device. For example, the memory controller 130 and the memory device 150 may be integrated as one semiconductor device to constitute a solid state drive (SSD). When the memory system 110 is used as an SSD, the operating speed of the host 102 connected to the memory system 110 can be improved. In another embodiment, the memory controller 130 and the memory device 150 may be integrated as one semiconductor device to constitute a memory card, such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks, each of which may include a plurality of pages, and each of the pages may include a plurality of memory cells coupled to a word line. In an embodiment, the memory device 150 may be a flash memory. The flash memory may have a 3-dimensional (3D) stack structure.

The memory device 150 may store memory map data between logical addresses and physical addresses.

The memory controller 130 may control the memory device 150 in response to a request from the host 102. For example, the memory controller 130 may provide data read from the memory device 150 to the host 102, and store data provided from the host 102 into the memory device 150. For this operation, the memory controller 130 may control read, program and erase operations of the memory device 150.

The memory controller 130 may include a host interface (I/F) 132, a memory processor 134, a memory I/F 142, and a memory 144, all operatively coupled via an internal bus.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATH), enhanced small disk interface (ESDI) and/or integrated drive electronics (IDE).

The host I/F 132 may be driven through firmware referred to as a host interface layer (HIL) in order to exchange data with the host.

The memory I/F 142 may serve as a memory/storage interface for interfacing the memory controller 130 and the memory device 150 such that the memory controller 130 controls the memory device 150 in response to a request from the host 102. When the memory device 150 is a flash memory, such as a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the memory controller 130 and the memory device 150, Specifically, the memory I/F 142 may support data transfer between the memory controller 130 and the memory device 150.

The memory I/F 142 may be driven through firmware referred to as a flash interface layer (FIL) in order to exchange data with the memory device 150.

The memory 144 may serve as a working memory of the memory system 110 and the memory controller 130, and store data for driving the memory system 110 and the memory controller 130. The memory controller 130 may control the memory device 150 to perform read, program and erase operations in response to a request from the host 102. The memory controller 130 may provide data read from the memory device 150 to the host 102, may store data provided from the host 102 into the memory device 150. The memory 144 may store data for the memory controller 130 and the memory device 150 to perform these operations.

For example, the memory 144 may store a read count for logical address region and a logical address region queue, as shown in FIG. 1. Furthermore, the memory 144 may cache some of the memory map data.

The memory 144 may be embodied by a volatile memory. For example, the memory 144 may be embodied by a static random access memory (SRAM) or a dynamic random access memory (DRAM). The memory 144 may be disposed within or externally to the memory controller 130. In the illustrated embodiment of FIG. 1, the memory 144 is disposed within the memory controller 130. In another embodiment, the memory 144 may be embodied by an external volatile memory having a memory interface transferring data between the memory 144 and the memory controller 130.

The memory processor 134 may control overall operation of the memory system 110.

The memory processor 134 may drive firmware to control overall operation of the memory system 110. The firmware may be referred to as flash translation layer (FTL). Also, the memory processor 134 may be realized as a microprocessor or a central processing unit (CPU).

The memory processor 134 may perform an operation requested by the host 102. The memory processor 13 may perform a foreground operation as the command operation corresponding to the command received from the host 102.

In some embodiments, the memory processor 134 may perform a write operation corresponding to a write request, a read operation corresponding to a read request, and an erase operation corresponding to an erase request. In a first example of the read operation, the memory processor 134 may access the memory device 150 with reference to the logical address and the memory map data provided from the host 102. In a second example of the read operation, the memory processor 134 may access the memory device 150 based on the physical address provided from the host 102.

In other embodiments, the memory controller 130 may perform a background operation onto the memory device 150 through the memory processor 134. The background operation performed onto the memory device 150 may include a garbage collection (GC) operation, a wear-leveling (WL) operation, a map flush operation, or a bad block management operation.

The host 102 may include a host processor 104, a host cache 106, and a host controller interface (I/F) 108.

The host 102 may include the host processor 104 and the host cache 106, which give the host 102 higher performance and larger capacity as compared with the memory system 110. Unlike the memory system 110, the host processor 104 and the host cache 106 have a spatial limitation and hardware upgrade of the host processor 104 and the host cache 106 is feasible as needed. Accordingly, in order to improve operational efficiency, the memory system 110 may utilize resources of the host 102.

In accordance with an embodiment, the storage space of the host cache 106 of the host 102 may be up to thousands of times greater than the memory 144 of the memory controller 130. Accordingly, the memory system 110 may provide the host cache 106 with memory map data used by the memory controller 130, thereby allowing the host cache 106 to be used as a cache memory for an address translation operation performed by the memory system 110. In such a case, based on host map data cached in the host cache 106, the host 102 may translate a logical address into a physical address and then provide the physical address to the memory system 110 together with a request. In that case, the memory system 110 need not translate the logical address into the physical address. Rather, the memory system 110 need only access the memory device 150 based on the provided physical address. Thus, it is possible to reduce the operation burden on the memory controller 130 in using the memory 144, thereby improving the operational efficiency of the memory system 110.

Even though the memory system 110 provides the map data to the host 102, the memory system 110 may still perform managing of the map data, for example, perform update, deletion, and generation of the map data. This is because the memory controller 130 performs a background operation such as garbage collection and wear leveling according to the operation state of the memory device 150 and determines a physical location in the memory device 150 at which data received from the host 102 is stored, so that a physical address of data in the memory device 150 may be changed by the memory controller 130.

That is, when it is determined that it is necessary to correct and update the map data sent to the host 102 in the process of managing the memory map data, the memory system 110 may request the host 102 to update the host map data. In response to the request of the memory system 110, the host 102 may update the host map data stored in the host cache 106. Accordingly, the host map data may be kept in the recent state, and even though the host controller I/F 108 converts an address value to be sent to the memory system 110 by using the host map data, the corresponding operation may be properly performed.

The host map data may include L2P map data for checking a physical address corresponding to a logical address. Meta data for indicating that the logical address and the physical address correspond to each other may include L2P map data for checking the physical address corresponding to the logical address and P2L map data for checking the logical address corresponding to the physical address. The host map data may include the L2P map data. The P2L map data is mainly used for the internal operation of the memory system 110, and may not be used for an operation, in which the host 102 stores data in the memory system 110 or reads data corresponding to a specific logical address from the memory system 110. In accordance with an embodiment, the P2L map data may not be sent from the memory system 110 to the host 102.

The memory controller 130 may store the L2P map data or the P2L map data in the memory device 150 while managing (i.e., generating, deleting, updating, and the like) the L2P map data or the P2L map data. Since the host cache 106 is a volatile memory, the host map data may disappear when an event occurs such as interruption of the supply of power to the host 102 and the memory system 110. Accordingly, the memory controller 130 may not only maintain the host map data in the recent state, but also store the L2P map data or the P2L map data in the recent state in the memory device 150.

Figure 3:
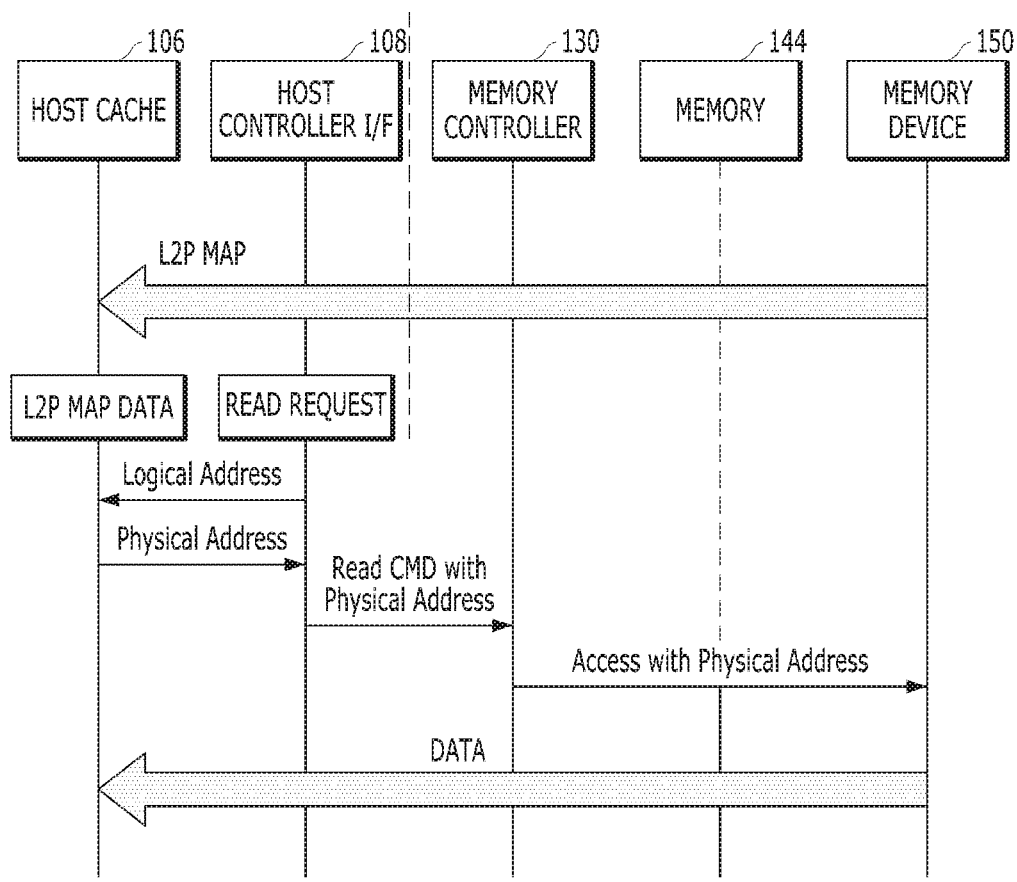
FIG. 3 is a diagram illustrating an operation in which a host reads data in a memory system when map data is stored in a host cache in the host.

FIG. 3 is a diagram illustrating an operation in which the host 102 reads data in the memory system 110 when map data is stored in the host cache 106 in the host 102.

Power is supplied to the host 102 and the memory system 110 and the host 102 and the memory system 110 may operate in cooperation with each other. When the host 102 and the memory system 110 operate in cooperation with each other, map data L2P MAP stored in the memory device 150 may be sent to the host cache 106.

When a read command is generated by the host processor 104 in the host 102, the read command is sent to the host controller I/F 108. After receiving the read command, the host controller I/F 108 sends a logical address corresponding to the read command to the host cache 106. Based on the map data L2P MAP stored in the host cache 106, the host controller I/F 108 may recognize a physical address corresponding to a logical address.

The host controller I/F 108 sends a read request to the memory controller 130 in the memory system 110 together with the physical address. Based on the received read request and physical address, the memory controller 130 may access the memory device 150. Data stored in a location of the memory device 150, which corresponds to the physical address, may be sent to the host cache 106.

A process of reading data from the memory device 150 implemented as a nonvolatile memory device may require more time than a process of reading data from the host cache 106, which is another nonvolatile memory. In the aforementioned read process, a process in which the memory controller 130 receives a logical address from the host 102 and searches for a physical address corresponding thereto may be omitted. Particularly, in the process in which the memory controller 130 searches for the physical address, an operation of reading meta data by accessing the memory device 150 may disappear. Accordingly, the process in which the host 102 reads data stored in the memory system 110 may be performed more quickly.

Figure 4:
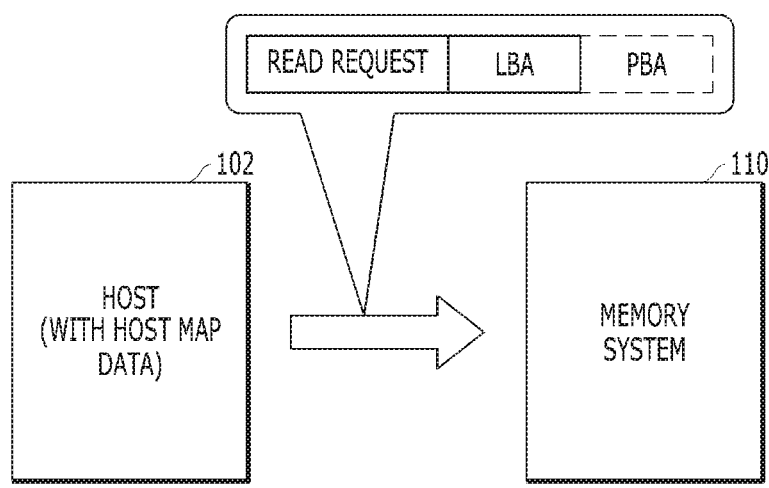
FIG. 4 is a diagram illustrating a first example of a transaction between a host and a memory system in a data processing system in accordance with an embodiment of the present disclosure.

FIG. 4 is a diagram illustrating a first example of a transaction between the host 102 and the memory system 110 in the data processing system 100 in accordance with an embodiment of the present disclosure.

Referring to FIG. 4, the host 102 storing host map data HOST MAP DATA may send a read request READ REQUEST with a logical address LBA and/or a physical address PBA to the memory system 110. When there is the physical address PBA corresponding to the logical address LBA corresponding to the read request READ REQUEST in the host map data, the host 102 may send, to the memory system 110, the read request READ REQUEST with the logical address LBA and the physical address PBA. However, when there is no physical address PBA corresponding to the logical address LBA corresponding to the read request READ REQUEST in the host map data, the host 102 may send, to the memory system 110, the read request READ REQUEST with only the logical address LBA, i.e., without the physical address PBA.

Although FIG. 4 is described in the context of a read request READ REQUEST as an example, the present disclosure may also be applied to a write request or an erase request which the host 102 may send the memory system 110.

Figure 5:
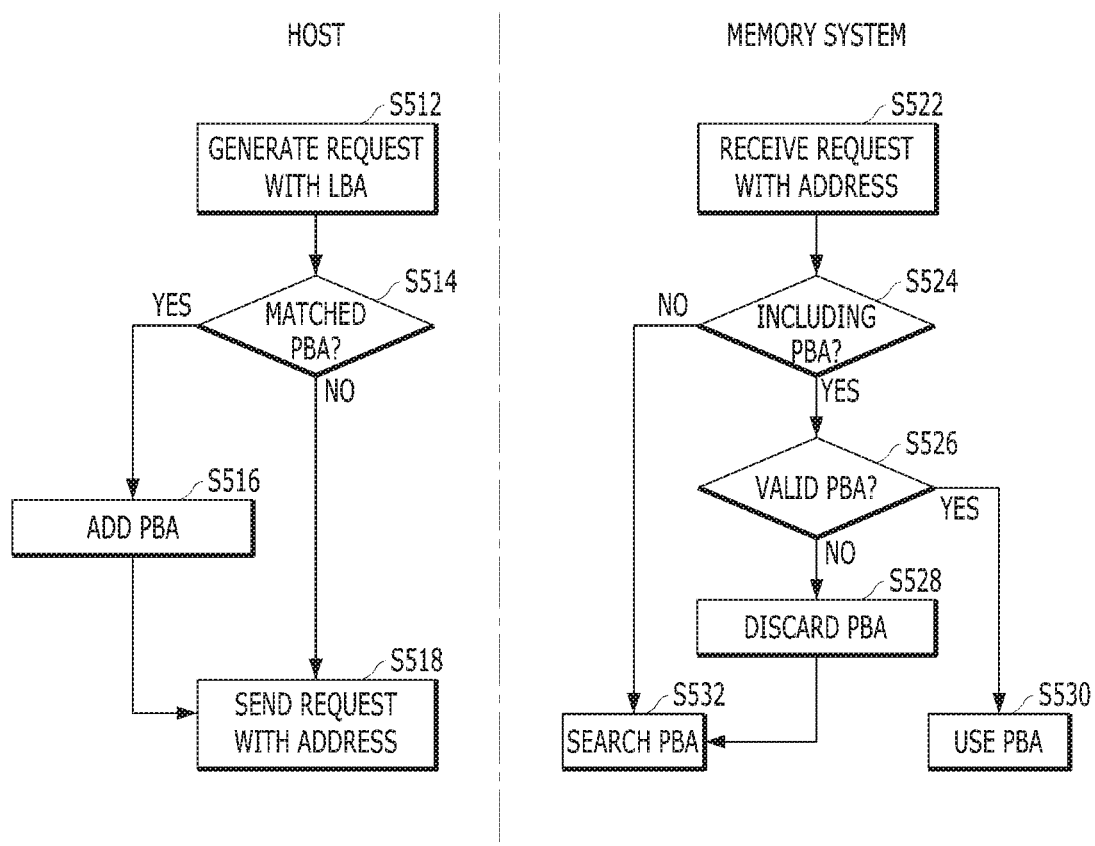
FIG. 5 is a diagram illustrating a first operation of a host and a memory system in accordance with an embodiment of the present disclosure.

FIG. 5 is a diagram illustrating a first operation between the host 102 and the memory system 110 in accordance with an embodiment of the present disclosure. Specifically, FIG. 5 illustrates a specific operation between the host, which sends a command with the logical address LBA and the physical address PBA, and the memory system, which receives the command, similarly to the transaction between the host 102 and the memory system 110 described in FIG. 4.

Referring to FIG. 5, in step S512, the host 102 may generate a request REQUEST with the logical address LBA. In step S514, the host 102 may check whether the physical address PBA corresponding to the logical address LBA exists in map data. When there is no physical address PBA ("NO" in step S514), the host 102 may send the request REQUEST with the logical address LBA in step S518.

When the corresponding physical address PBA is in the map data ("YES" in step S514), the host 102 may add the physical address PBA to the request REQUEST with the logical address LBA in step S516. In step S518, the host 102 may send the request REQUEST with the logical address LBA and the physical address PBA.

The memory system 110 may receive a request sent from the host 102 in step S522. In step S524, the memory system 110 may check whether the physical address PBA is included in the received request. When the physical address PBA is not included in the received request ("NO" in step S524), the memory system 110 may search for a physical address corresponding to a logical address in the received request in step S532.

When the physical address PBA is included in the received request ("YES" in step S524), the memory system 110 may check whether the physical address PBA is valid in step S526. The memory system 110 may send map data to the host 102, and the host 102 may perform mapping based on the map data sent by the memory system 110, put the physical address PBA into a request, and send the request. However, after the memory system 110 sends the map data to the host 102, the map data managed by the memory system 110 may be changed and updated. As described above, when the map data is in a dirty state, the physical address PBA sent by the host 102 may not be used as is. Thus, the memory system 110 may check whether the physical address PBA in the received request is valid. When the physical address PBA in the received request is valid ("YES" in step S526), the memory system 110 may perform an operation corresponding to the request by using the physical address PBA in step S530.

When the physical address PBA in the received request is not valid ("NO" in step S526), the memory system 110 may discard the physical address PBA in the received request in step S528. In such a case, in step S532, the memory system 110 may search for the physical address PBA based on the logical address LBA in the received request.

Figure 6:
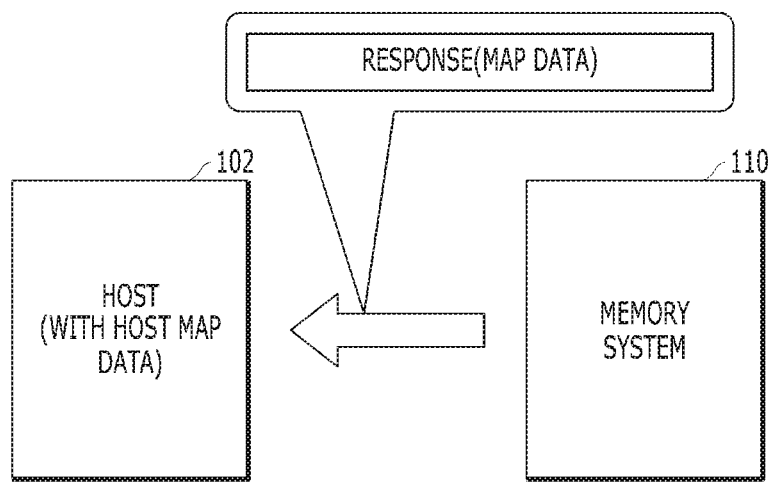
FIG. 6 is a diagram illustrating a second example of a transaction between a host and a memory system in a data processing system in accordance with an embodiment of the present disclosure.

FIG. 6 is a diagram illustrating a second example of a transaction between the host 102 and the memory system 110 in the data processing system 100 in accordance with an embodiment of the present disclosure.

Referring to FIG. 6, the memory system 110 may send map data MAP DATA to the host 102. The memory system 110 may send the map data MAP DATA by using a response RESPONSE to a request of the host 102.

The memory system 110 and the host 102 may exchange a request and a response based on a unit format set according to a set protocol. For example, the host 102 may provide the memory system 110 with a read buffer request for acquiring data buffered in the memory 44. The memory system 110 may send the map data MAP DATA buffered in the memory 44 as a response RESPONSE to the read buffer request.

Figure 7:
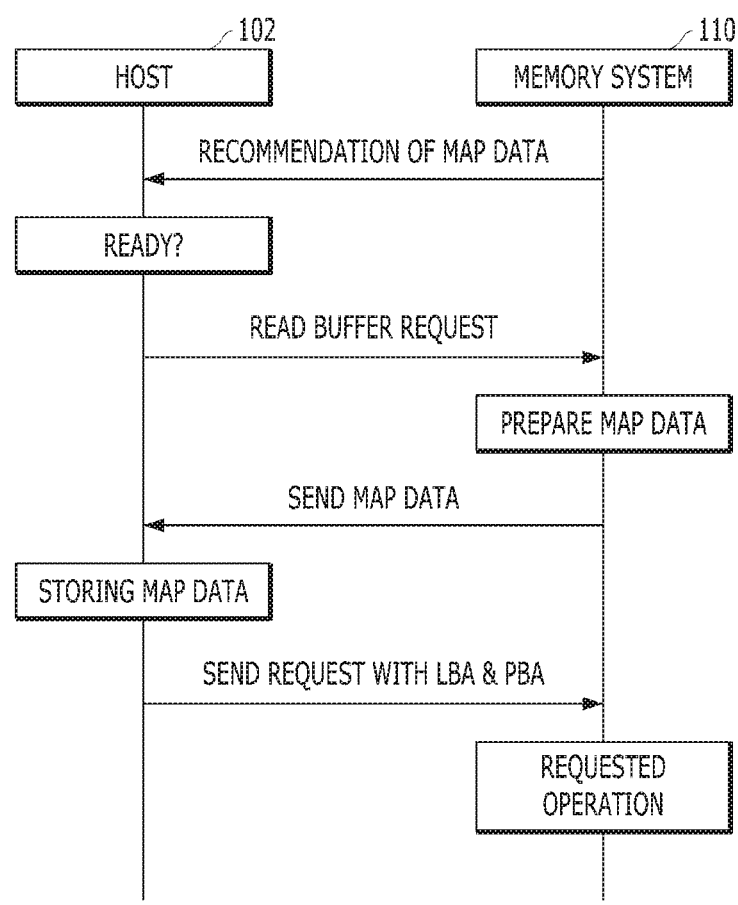
FIG. 7 is a diagram illustrating a second operation between a host and a memory system in accordance with an embodiment of the present disclosure.

FIG. 7 is a diagram illustrating a second operation between the host 102 and the memory system 110 in accordance with an embodiment of the present disclosure. Specifically, FIG. 7 illustrates a process in which the host 102 requests the memory system 110 to send map data and the memory system 110 sends the map data in response to the request of the host 102.

Referring to FIG. 7, the memory system 110 may recommend, to the host 102, at least some map data satisfying conditions among the memory map data.

For example, the map manager 136 of the memory system 110 may recommend, to the host 102, map data associated with a logical address region whose read count exceeds a threshold. A read count method of the map manager 136 in accordance with an embodiment of the present disclosure is described in detail with reference to FIG. 8 to FIG. 11.

The host 102 may prepare to receive the map data recommended by the memory system 110. For example, the host 102 may assign a space capable of storing the map data.

The host 102 may provide the memory system 110 with a read buffer request in order to acquire the map data recommended by the memory system 110. The memory system 110 may prepare the map data in response to the request of the host 102.

The memory system 110 may send the prepared map data to the host 102. The host 102 may store the map data sent by the memory system 110 in an internal storage space (for example, the host cache 106 in FIG. 2).

The host 102 may put the physical address PBA and the logical address LBA into a request REQUEST to be sent to the memory system 110 and send the request REQUEST by using the stored map data. The memory system 110 may perform a requested operation by using the physical address PBA in the request REQUEST.

Figure 8:
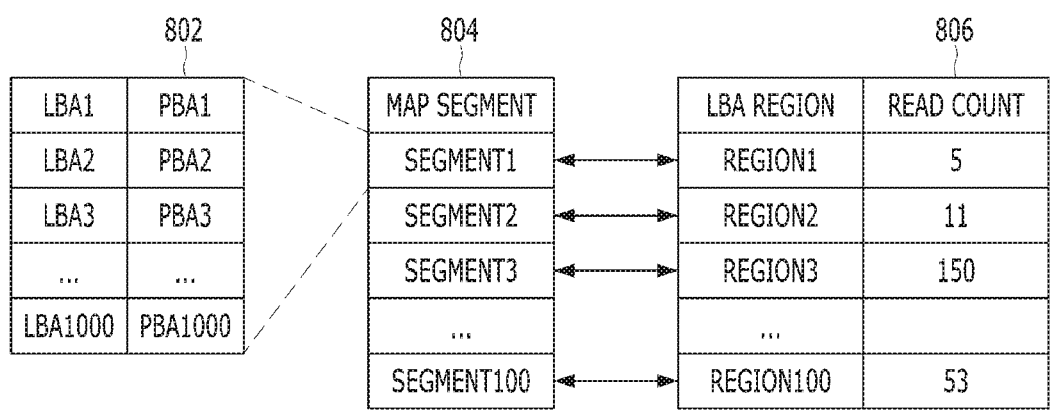
FIG. 8 is a diagram illustrating map data and read counts for each logical address region in accordance with an embodiment of the present disclosure.

FIG. 8 is a diagram illustrating map data and read counts for each logical address region in accordance with an embodiment of the present disclosure.

By way of example, FIG. 8 illustrates memory map data 804, a map segment 802 that is a part of the memory map data, and a read count table 806 for each logical address region.

The map segment 802 may store L2P map data between a plurality of logical addresses and a plurality of physical addresses. In the illustrated example of FIG. 8, a first logical address LBA1, a second logical address LBA2, a third logical address LBA3, and a $1000^{th}$ logical address LBA1000 may correspond to a first physical address PBA1, a second physical address PBA2, a third physical address PBA3, and a $1000^{th}$ physical address PBA1000, respectively. In accordance with an embodiment, the map segment 802 may include information indicating a physical address of a corresponding one of a plurality of consecutive logical addresses.

The memory map data 804 may include a plurality of map segments. In the illustrated example of FIG. 8, the memory map data 804 may include first to $100^{th}$ segments. The plurality of map segments may store L2P map data associated with a plurality of logical addresses, respectively. For example, the first map segment SEGMENT1 may include the consecutive first to $1000^{th}$ logical addresses LBA1 to LBA1000, and the second map segment SEGMENT2 may include consecutive $1001^{th}$ to $2000^{th}$ logical addresses LBA1001 to LBA2000.

The memory map data 804 may be managed by the map manager 136 on a map segment basis. For example, the map manager 136 may store the map data in the memory device 150 on a map segment basis and update the map data on that same basis. Then, the map manager 136 may provide the map data on a map segment basis when providing the map data to the host 102.

As described with reference to FIG. 1, the map manager 136 may selectively provide the host 102 with some of the plurality of map segments. Based on the read count for each logical address region, the map manager 136 may determine a map segment to be provided to the host 102.

The read count table 806 of FIG. 8 may include a plurality of logical address (i.e., LBA) regions and read counts corresponding to the logical address regions, respectively.

Each logical address region in the read count table 806 may correspond to a respective one of the map segments in the memory map data 804. For example, the first map segment SEGMENT1 may correspond to a first logical address region REGION1. The identifier of the first logical address region may be "REGION1". The first map segment SEGMENT1 is associated with the first to $1000^{th}$ logical addresses LBA1 to LBA1000, and the first logical address region REGION1 may include the first to $1000^{th}$ logical addresses LBA1 to LBA1000.

Each time a read request is received from the host 102, the map manager 136 may update a read count of a logical address region including the logical address associated with the read request. When the logical address region has been frequently and recently read, the map manager 136 may add a proportionately large increment (i.e., a weighted value) to the read count of the logical address region, thereby updating the read count. The map manager 136 may determine a value of the increment, which is to be added to the read count of the logical address region, by referring to a logical address region queue. The logical address region queue and the increment in the read count for each logical address region are described in detail with reference to FIG. 9A to FIG. 9C and FIG. 10A and FIG. 10B.

FIG. 9A to FIG. 9C and FIG. 10A and FIG. 10B illustrate a logical address region queue in accordance with an embodiment of the present disclosure.

By way of example, FIG. 9A to FIG. 9C and FIG. 10A and FIG. 10B illustrate a logical address region queue with a total of 7 entries. Each entry may store an identifier of a recently accessed logical address region and an increment value (i.e., a weighted value) of a read count corresponding to the logical address region. In the logical address region queue, the leftmost entry may queue an identifier of the most recently used (MRU) logical address region in the queue, and the rightmost entry may queue an identifier of the least recently used (LRU) logical address region in the queue. Hereinafter, the leftmost entry and the rightmost entry are referred to as an MRU entry and an LRU entry, respectively.

In accordance with an embodiment, the map manager 136 may group the entries of the logical address region queue into a plurality of groups. By way of example, FIG. 9A to FIG. 9C and FIG. 10A and FIG. 10B illustrate cases where, in the logical address region queue, five entries are set as a first group GROUP1 and two entries are set as a second group GROUP2. Logical address region identifiers queued in the entries of the first group GROUP1 may be identifiers of logical address regions accessed more recently than identifiers of logical address regions queued in the entries of the second group GROUP2. The number of entries of each of the first group GROUP1 and the second group GROUP2 may vary according to design. In an embodiment of the present disclosure, the map manager 136 may determine the number of entries of the first group GROUP1 as the maximum number of recommended map data segments described with reference to FIG. 1. The map manager 136 may determine the number of entries of the second group GROUP2 as a number obtained by subtracting the recommended maximum number (i.e., 5) from the total number of entries (i.e., 7) in the logical address region queue.

When a read request associated with a certain logical address region is received from the host 102, the map manager 136 may queue an identifier of the logical address region in the MRU entry. After that, the map manager 136 may increase an increment (i.e., a weighted value) for a read count associated with that logical address region. The map manager 136 may add the increment to the read count of the logical address region.

When the logical address region identifier queued in the MRU entry and belonging to the first group is not accessed, the logical address region identifier may be moved to the second group. The map manager 136 may decrease the increment (i.e., a weighted value) for a read count associated with the logical address region belonging to the second group, according to conditions. Then, the map manager 136 may remove the logical address region identifier, which is moved from the LRU entry, from the logical address region queue, and initialize the increment.

The operation in which the map manager 136 increases the increment (i.e., a weighted value) for the read count is described in detail with reference to FIG. 9A to FIG. 9C. The operation in which the map manager 136 decreases the increment (i.e., the weighted value) for the read count is described in detail with reference to FIG. 10A and FIG. 10B.

By way of example, FIG. 9A to FIG. 9C illustrate the state of the logical address region queue according to the read request of the host in time series.

FIG. 9A illustrates the logical address region queue when a first read request associated with a $10^{th}$ logical address region is received from the host 102 in a state in which the logical address region queue is empty. The map manager 136 may queue the $10^{th}$ logical address region identifier REGION10 in the MRU entry in response to the first read request. An increment corresponding to the $10^{th}$ logical address region may have an initialized value. The initialized increment value may vary according to design, and in an embodiment, the initialized increment value may be 1. The map manager 136 may increase the read count of the $10^{th}$ logical address region in the read count table 806 by the increment value, for example, 1.

FIG. 9B illustrates the logical address region queue when a second read request associated with an $11^{th}$ logical address region is received from the host 102 in the state of FIG. 9A. The map manager 136 may queue the $11^{th}$ logical address region identifier REGION11 in the MRU entry in response to the second read request. An increment corresponding to the $11^{th}$ logical address region may have an initialized value. The map manager 136 may increase the read count of the $11^{th}$ logical address region in the read count table 806 by the increment value, for example, 1.

FIG. 9C illustrates the logical address region queue when a third read request associated with the $10^{th}$ logical address region is received from the host 102 in the state of FIG. 9B. When the third read request is received, the $10^{th}$ logical address region identifier REGION10 has already been queued in the logical address region queue. Thus, the $10^{th}$ logical address region may be a recently read logical address region. The map manager 136 may increase the increment value of the logical address region by a fixed first value such that, when the recently read $10^{th}$ logical address region is read again, the read count increases significantly more than the initial increment value. The first value may vary according to design, and in the example of FIG. 9C, the first value may be 5. Referring to FIG. 9C, the map manager 136 may determine the increment value of the $10^{th}$ logical address region as 6 increased from 1 by 5. The map manager 136 may increase the read count of the $10^{th}$ logical address region in the read count table 806 by the increment value, for example, 6.

Figure 10A:
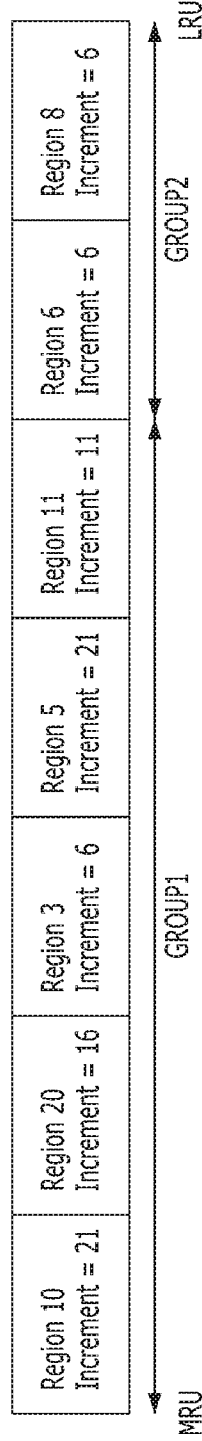
Figure 10B:
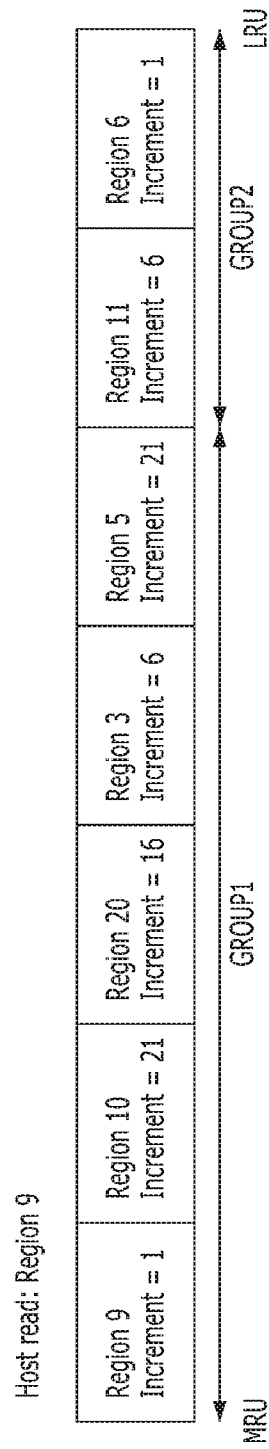

FIG. 10A and FIG. 10B illustrate the state of the logical address region queue according to the read request of the host over time.

FIG. 10A illustrates a case where the logical address region queue is full. Specifically, FIG. 10A illustrates a case where identifiers of the $10^{th}$, $20^{th}$, $3^{rd}$, $5^{th}$, $11^{th}$, $6^{th}$, and $8^{th}$ logical address regions are queued in the respective entries from the MRU entry to the LRU entry.

FIG. 10B illustrates the logical address region queue when a fourth read request associated with a ninth logical address region is received from the host 102 in the state of FIG. 10A.

When the fourth read request is received, the $9^{th}$ logical address region identifier REGION9 may not have been queued in the logical address region queue. The map manager 136 may remove the $8^{th}$ logical address region identifier REGION8 queued in the LRU entry and queue the $9^{th}$ logical address region in the MRU entry. The map manager 136 may initialize an increment in the $8^{th}$ logical address region to 1. Referring to FIG. 10B, the first group may include the identifiers of the $9^{th}$, $10^{th}$, $20^{th}$, $3^{rd}$, and $5^{th}$ logical address regions and the second group may include the identifiers of the $11^{th}$ and $6^{th}$ logical address regions.

The map manager 136 may increase the read count of the $9^{th}$ logical address region in the read count table 806 by the initial increment value of 1.

Each time a new logical address region is queued in the logical address region queue, the map manager 136 may decrease each of the increment values of the $11^{th}$ and $6^{th}$ logical address regions, which belong to the second group, by a fixed second value. The second value may vary according to design, and in the example of FIG. 10B, the second value may be 5, Referring to FIG. 10A and FIG. 10B, the map manager 136 may queue the $9^{th}$ logical address region identifier in the logical address region queue and determine the increment value of the $11^{th}$ logical address region as 6 decreased from 11 by 5. Similarly, the map manager 136 may determine the increment value of the $6^{th}$ logical address region as 1 decreased from 6 by 5.

Figure 11:
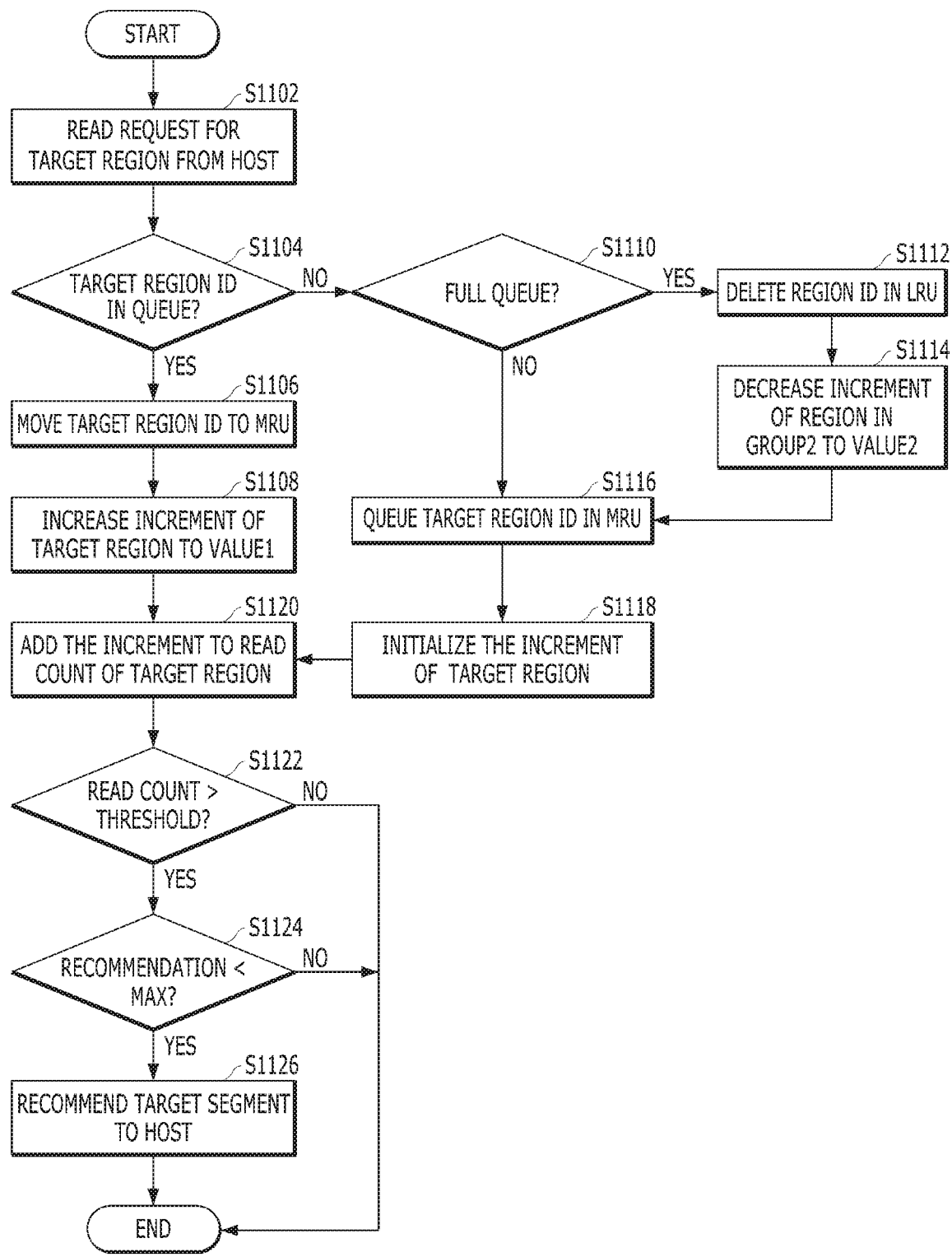
FIG. 11 is a flowchart illustrating an operation of a map manager in accordance with an embodiment of the present disclosure.

FIG. 11 is a flowchart illustrating operation of the map manager 136 in accordance with an embodiment of the present disclosure.

Referring to FIG. 11, in step S1102, the memory controller 130 may receive a read request associated with a logical address region from the host 102. The logical address region, which is a target for the read request, is referred to as a target logical address region.

In step S1104, the map manager 136 may determine whether an identifier of the target logical address region has been queued in the logical address region queue.

When the target logical address region identifier has been queued in the logical address region queue ("YES" in step S1104), the map manager 136 may move the target logical address region identifier to the MRU entry in step S1106.

In step S1108, the map manager 136 may increase an increment in the target logical address region by a fixed first value. Then, the map manager 136 may perform step S1120.

When the target logical address region identifier has not been queued in the logical address region queue ("NO" in step S1104), the map manager 136 may determine, in step S1110, whether the logical address region queue is full.

When the logical address region queue is full ("YES" in step S1110), the map manager 136 may remove (or delete) a logical address region identifier queued in the LRU entry in step S1112. The map manager 136 may initialize an increment value corresponding to the removed logical address region identifier. Then, the map manager 136 may move each of the remaining logical address region identifiers queued in the logical address region queue toward the LRU entry by one entry.

In step S1114, the map manager 136 may decrease an increment of each of the logical address regions, which belong to the second group as a result of the moving, by a fixed second value. Then, the map manager 136 may perform step S1116.

When the logical address region queue is not full ("NO" in step S1110), the map manager 136 may perform step S1116.

In step S1116, the map manager 136 may queue the target logical address region identifier in the MRU entry. Then, the map manager 136 may perform step S1118.

In step S1118, the map manager 136 may initialize the increment of the target logical address region. In step S1120, the map manager 136 may add the increment to the read count of the target logical address region.

In step S1122, the map manager 136 may determine whether the read count exceeds a threshold.

When the read count does not exceed the threshold ("NO" in step S1122), the map manager 136 may end the operation.

When the read count exceeds the threshold ("YES" in step S1122), the map manager 136 may determine, in step S1124, whether the current number of map segments recommended is less than the recommended maximum number.

When the current number of map segments recommended is greater than or equal to the recommended maximum number ("NO" in step S1124), the map manager 136 may end the operation.

When the current number map segments recommended is less than the recommended maximum number ("YES" in step S1124), the map manager 136 may recommend a target map segment corresponding to the target logical address region to the host 102 in step S1126.

As described with reference to FIG. 7, the host 102 may send the read buffer request in response to the recommendation, and the memory system 110 may provide the host 102 with the target map segment in response to the read buffer request.

In accordance with implementations, the map manager 136 may periodically decrease read counts in the read count table to maintain the number of logical address regions, each of which read count exceeds a threshold, at a constant level.

In accordance with an embodiment of the present disclosure, as described above, the map manager 136 may queue an identifier of a logical address region associated with a read request from the host 102 in the MRU entry of an internal logical address region queue, increase an increment for a read count of the logical address region queue by a first value according to whether the identifier of the logical address region has been queued in the logical address region queue before being queued in the MRU entry, add the increment to the read count of the logical address region queue, provide a map segment corresponding to the logical address region to the host 102 according to a threshold of the read count, and control a read operation of the memory device based on a physical address according to whether the read request includes the physical address.

In accordance with an embodiment of the present disclosure, the map manager 136 may reflect not only the number of times that a logical address region is actually read, but also the frequency at which the logical address region is read, in a read count of each logical address region. Based on the read count, the map manager 136 may provide the host 102 with a map segment corresponding to a logical address region that is recently and frequently read. When providing a read request, the host 102 may translate a logical address into a physical address by referring to the map segment and provide the memory system 110 with the read request, so that the read operation performance of the memory system 110 may be improved.

Although various embodiments have been illustrated and described, it will be apparent to those skilled in the art that various changes and modifications may be made without departing from the spirit and scope of the invention as defined in the following claims.

What is claimed is:

1. An operation method of a controller for controlling a memory device, the operation method comprising:
   queuing an identifier of a logical address region associated with a read request from a host in a most recently used (MRU) entry of a logical address region queue;
   increasing a weighted value for a read count of the logical address region by a first value in response to the identifier of the logical address region previously being queued in another entry of the logical address region queue before being queued in the MRU entry of the logical address region queue;

adding the weighted value to the read count of the logical address region;

providing the host with a map segment corresponding to the logical address region according to a threshold of the read count; and controlling a read operation of the memory device based on a physical address according to whether the read request includes the physical address.

2. The operation method of claim 1, wherein the logical address region queue includes entries of a first group for queuing identifiers of logical address regions, and entries of a second group for queuing identifiers logical address regions that have already been read before the identifiers of the logical address regions queued in the entries of the first group.

3. The operation method of claim 2, wherein the providing of the host with the map segment comprises:
recommending the map segment to the host when the read count of the logical address region exceeds a threshold and the number map segments recommended to the host does not exceed a maximum number of recommendations; and
providing the host with the map segment buffered in a memory of the controller, in response to a read buffer request from the host.

4. The operation method of claim 3, wherein the number of entries of the first group is equal to the maximum number of recommendations.

5. The operation method of claim 2, further comprising:
moving, by one entry, each identifier of a logical address region already queued in the logical address region queue before the identifier of the logical address region is queued in the MRU entry; and
decreasing, by a second value, a weighted value for a read count of each logical address region belonging to the second group as a result of the moving.

6. The operation method of claim 5, further comprising:
initializing a weighted value for a read count of a logical address region removed from the logical address region queue as a result of the moving.

7. The operation method of claim 1, further comprising:
translating a logical address associated with the read request into a physical address when no physical address is included in the read request; and
controlling a read operation of the memory device based on the physical address.

8. A controller for controlling a memory device, comprising:
a memory configured to store a read count for each logical address region and a logical address region queue for queuing recently accessed logical address regions; and
a processor configured to queue an identifier of a logical address region associated with a read request from a host in a most recently used (MRU) entry of a logical address region queue, increase a weighted value for a read count of the logical address region by a first value in response to the identifier of the logical address region previously being queued in another entry of the logical address region queue before being queued in the MRU entry of the logical address region queue, add the weighted value to the read count of the logical address region, provide the host with a map segment corresponding to the logical address region according to a threshold of the read count, and control a read operation of the memory device based on a physical address according to whether the read request includes the physical address.

9. The controller of claim 8, wherein the logical address region queue includes entries of a first group for queuing identifies of logical address regions, and entries of a second group for queuing identifiers of logical address regions that have already been read before the identifiers of the logical address regions queued in the entries of the first group.

10. The controller of claim 9, wherein the processor recommends the map segment to the host when the read count of the logical address region exceeds a threshold and the number map segments recommended to the host does not exceed a maximum number of recommendations, and provides the host with the map segment buffered in a memory of the controller, in response to a read buffer request from the host.

11. The controller of claim 10, wherein the number of entries of the first group is equal to the maximum number of recommendations.

12. The controller of claim 9, wherein the processor moves, by one entry, each identifier of a logical address region already queued in the logical address region queue before the identifier of the logical address region is queued in the MRU entry, and decreases, by a second value, a weighted value for a read count of each logical address region belonging to the second group as a result of the moving.

13. The controller of claim 12, wherein the processor initializes a weighted value for a read count of a logical address region removed from the logical address region queue as a result of the moving.

14. The controller of claim 8, wherein the processor translates a logical address associated with the read request into a physical address when physical address is included in the read request, and controls a read operation on the memory device based on the physical address.

15. A system comprising:
a host;
a memory device including a plurality of memory regions; and
a memory controller configured to:
receive, from the host, read requests associated with the plurality of memory regions;
determine a weighted value for each memory region proportional to the number of read requests on that memory region;
determine a read count for each memory region based on the number of read requests corresponding to that memory region and a corresponding weighted value; and
provide, to the host, map information of a physical address for a select memory region among the plurality of memory regions, the select memory region having a read count greater than a threshold,
wherein the host is configured to:
translate a logical address associated with a read operation on the select memory region to the physical address based on the map information; and
transmit, to the controller, a read command and the physical address for the read operation on the select memory region, and
wherein the memory controller includes a processor configured to queue an identifier of a logical address region associated with the read requests from a host in a most recently used (MRU) entry of a logical address region queue, and increase the weighted value for the read count of the logical address region by a first value in response to the identifier of the logical address region previously being queued in another entry of the logical address region queue before being queued in the MRU entry of the logical address region queue.

* * * * *